United States Patent
Champley (10) Patent No.: US 10,282,869 B2
(45) Date of Patent: May 7, 2019

(54) FEW-VIEW IMAGE RECONSTRUCTION

(71) Applicant: Lawrence Livermore National Security, LLC, Livermore, CA (US)

(72) Inventor: Kyle Champley, Walnut Creek, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 122 days.

(21) Appl. No.: 15/392,985

(22) Filed: Dec. 28, 2016

(65) Prior Publication Data

US 2018/0182128 A1   Jun. 28, 2018

(51) Int. Cl.
G06T 11/00 (2006.01)
G06T 17/10 (2006.01)

(52) U.S. Cl.
CPC ............ *G06T 11/003* (2013.01); *G06T 17/10* (2013.01); *G06T 2210/41* (2013.01)

(58) Field of Classification Search
CPC combination set(s) only.
See application file for complete search history.

(56) References Cited

U.S. PATENT DOCUMENTS

| 6,990,169 | B2 * | 1/2006 | Claus | A61B 6/00 378/4 |
| 2011/0142316 | A1 * | 6/2011 | Wang | G06T 11/006 382/131 |
| 2012/0308101 | A1 * | 12/2012 | Zeng | G06T 11/008 382/131 |
| 2016/0100814 | A1 * | 4/2016 | Schildkraut | A61B 6/032 382/131 |
| 2016/0242721 | A1 * | 8/2016 | Zou | A61B 6/5211 |
| 2017/0184756 | A1 * | 6/2017 | Miao | G01V 5/005 |
| 2018/0033165 | A1 * | 2/2018 | Zeng | G06T 11/003 |
| 2018/0165839 | A1 * | 6/2018 | Lv | G06T 11/006 |

* cited by examiner

*Primary Examiner* — Tsung-Yin Tsai
(74) *Attorney, Agent, or Firm* — Perkins Coie LLP (57) ABSTRACT

A CT image reconstruction system is provided that provides a solution to a few-view problem by generating a 3D image from measurements and a forward projection matrix for a CT scan of an object that tends to minimize streaks and other artifacts. The system initially receives measurements and a forward projection matrix for the CT scan. The system during an initial stage generates an initial 3D image based on various constraints so that (1) the reconstruction of the initial 3D image can be perform quickly and (2) the difference between the measurements and the forward projection of the initial 3D image has significantly lower contrast and high frequency content as compared the measurements themselves. The system then during a final stage applies an iterative algorithm to reconstruct the 3D image with the 3D image initialized to the initial 3D image at the beginning of the iterative algorithm.

31 Claims, 6 Drawing Sheets

FEW-VIEW IMAGE RECONSTRUCTION

STATEMENT REGARDING FEDERALLY SPONSORED RESEARCH

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND

Computed Tomography ("CT") is a technique that non-invasively generates cross-sectional images of the linear attenuation coefficients ("LACs") of materials in an object of interest. CT has been used extensively in medical and security applications such as for generating a scan of a brain or a scan of baggage at an airport. The LAC is a measure of the attenuation of X-rays as the X-rays pass through a certain material and is in units of inverse length (e.g., per centimeter). To generate the LACs, CT employs an X-ray source and an X-ray detector. The X-ray source transmits X-rays through the object with an initial intensity, and the X-ray detector, which is on the opposite side of the object from the source, measures the final intensities of the X-rays that pass through the object and impinge on pixels of a detector. CT collects measurements by positioning the source and detector at various angles relative to the object and collects the measurements of the final intensity at each angle. The measurements for an angle are referred to as a projection. The measurements of the intensities may be represented as a negative of a logarithm of a ratio of transmission data of a scan of the object to transmission data of a scan without the object (e.g., scan of air). Various techniques may be used to collect measurements at different angles relative to the object. For example, the source and detector may be stationary and the object may be rotated, the object may be stationary and the source and detector may be rotated, and multiple stationary transmitters and detectors may be positioned at different angles. CT algorithms then reconstruct from the collection of measurements a 3D image of the object that specifies the LAC for each volume element ("voxel") with the volume of the object. The cross-sectional images are generated from the 3D image.

The forward model that links the unknown 3D volume with the CT measurements can be represented by the following equation:

$$Pf = g$$

where g represents a vector of the measurements, f represent a vector with an LAC for each voxel, and P represent a forward projection matrix. The forward projection matrix indicates which voxels an X-ray passed through in travelling from the X-ray source to the X-ray detector. The goal of CT is to determine f given P and g. Example values for P and g are given for a very simplified CT scan in the following:

$$\underbrace{\begin{bmatrix} 1 & 1 & 1 & 0 & 0 & 0 & 0 & 0 & 0 \\ 0 & 0 & 0 & 1 & 1 & 1 & 0 & 0 & 0 \\ 0 & 0 & 0 & 0 & 0 & 0 & 1 & 1 & 1 \\ 1 & 0 & 0 & 1 & 0 & 0 & 1 & 0 & 0 \\ 0 & 1 & 0 & 0 & 1 & 0 & 0 & 1 & 0 \\ 0 & 0 & 1 & 0 & 0 & 1 & 0 & 0 & 1 \\ 1 & 0 & 0 & 0 & 0 & 0 & 0 & 0 & 0 \\ 0 & 1 & 0 & 1 & 0 & 0 & 0 & 0 & 0 \\ 0 & 0 & 1 & 0 & 1 & 0 & 1 & 0 & 0 \\ 0 & 0 & 0 & 0 & 0 & 1 & 0 & 1 & 0 \\ 0 & 0 & 0 & 0 & 0 & 0 & 0 & 0 & 1 \end{bmatrix}}_{\text{forward model}} \underbrace{\begin{bmatrix} f_1 \\ f_2 \\ f_3 \\ f_4 \\ f_5 \\ f_6 \\ f_7 \\ f_8 \\ f_9 \end{bmatrix}}_{\text{unknown}} = \underbrace{\begin{bmatrix} 3 \\ 4 \\ 3 \\ 3 \\ 4 \\ 3 \\ 1 \\ 2 \\ 4 \\ 2 \\ 1 \end{bmatrix}}_{\text{measurements}}$$

Conventional CT requires that the number of projections be roughly equal to the number of pixels in a projection. In practice, the number of projections that can be collected may be severely limited for various reasons. For example, some CT protocols require that the X-ray dose delivered to the object (e.g., baggage or patient) be limited. One way to reduce the dose is to limit the number of projections that are collected. As another example, CT systems that are flux-limited may employ long integration times per projection to collect adequate measurements. CT systems may be flux-limited because of dim sources (low current), large source-to-detector distances, small detector pixels, and/or highly attenuating objects. To increase throughput, a flux-limited CT system may have time to generate only a small number of projections. As another example, when the object is in motion (e.g., a beating human heart), a CT system may deliberately collect a limited number of projections to shorten the data acquisition time to reduce the artifacts associated with the object motion. As another example, some CT systems employ multiple source-detector pairs mounted on a stationary gantry (e.g., for scanning carry-on baggage at an airport.) The projections of such a CT system are limited by the number of sources.

When the number of projections is limited to one or more orders of magnitude smaller than the number pixels in a projection, a problem arises in that the reconstructed 3D image is generally polluted with streak artifacts. This problem is referred to as the few-view reconstruction problem. The few-view reconstruction problem arises because the number of unknowns (i.e., the number of voxels) is much greater than the number of linear equation represented by the projections and the measurements are noisy.

DETAILED DESCRIPTION

A CT image reconstruction ("CTIR") system is provided that solves the few-view problem by generating a 3D image from measurements and a forward projection matrix for a CT scan of an object that tends to minimize streaks and other artifacts. In some embodiments, the CTIR system initially receives measurements and a forward projection matrix in which the number of voxels is much greater than the number of linear equations represented by the measurements and the forward projection matrix. The CTIR system during an initial stage generates an initial 3D image based on various constraints so that (1) the reconstruction of the initial 3D image can be performed quickly (as compared to the reconstruction of the final 3D image) and (2) the difference between the measurements and the forward projection of the initial 3D image has significantly lower contrast and high frequency content as compared the measurements themselves. The CTIR system then during a final stage applies an iterative algorithm (e.g., a convex optimization algorithm) to reconstruct the 3D image with the 3D image at a beginning of the iterative algorithm set to or seeded with the initial 3D image of the initial phase. Since the reconstruction of the final stage does not have the constraints of the initial stage, the CTIR system reduces the risk of biasing the final 3D image based on those constraints.

In some embodiments, the CTIR system generates a 3D image of an object from measurements of an object and a forward projection matrix. For example, the object may be a checked bag at an airport that is scanned by a CT system at the airport or a patient undergoing a CT scan at a hospital. The CTIR system identifies the foreground voxels of the 3D image. A foreground voxel is a voxel that is part of a region of the object that is occupied by a highly attenuating object or material. In an initial stage, the CTIR system generates, based on the measurements, the forward projection matrix, and the foreground voxels, an initial 3D image that specifies reconstructed attenuation coefficients for the foreground voxels, and in some embodiments for the background voxels, of the 3D image. In some embodiments, the reconstructed attenuation coefficients for each foreground voxel is generated dynamically as needed. In such a case, the processing of the initial phase would be interleaved with the processing of the first iteration of the final stage. In a final stage, the CTIR system reconstructs, based on the measurements and the forward projection matrix, the 3D image by iteratively generating 3D images starting with the 3D image seeded with the initial 3D image until a solution criterion is satisfied. When the solution criterion is satisfied, the last generated 3-D image is the final 3D image.

The CTIR system may use various techniques to generate the initial 3D image. Using one technique, the CTIR system generates the initial 3D image by (1) reconstructing a foreground 3D image based on the measurements, the forward projection matrix, and the foreground voxels and (2) setting the attenuation coefficient of each foreground voxel, and possibly each background voxel (depending on the algorithm used in the initial phase) of the initial 3D image based on the attenuation coefficient of the corresponding voxel of the foreground 3D image. Using another technique, the CTIR system may generate the initial 3D image by identifying sets of spatially connected foreground voxels and a set for each background voxel and reconstructing the initial 3D image, based on the measurements and the forward projection matrix and assuming that all the voxels in a set have the same attenuation coefficient. Since the reconstruction of these techniques would typically calculate a number of the attenuation coefficients that is much smaller than the number of voxels, the generating of the initial 3D image is much less computationally expensive than calculating an attenuation coefficient for each voxel.

The CTIR system may employ a convex optimization technique, such as a gradient descent ("GD") or a conjugate gradient ("CG") technique, for the initial and final stages. The initial stage, however, employs a cost function that is different from that employed by the final stage and does not calculate a separate attenuation coefficient for each voxel. These convex optimization techniques seek a solution that minimizes a cost (or an objective) function by iteratively updating the unknown 3D volume using an equation that is based the gradient (first derivative) and Hessian (second derivative) of the cost function. The CTIR system may speed up the convergence to a solution using a preconditioner, which is a positive definite operator that decreases the "condition number" of the gradient of the cost function. A condition number measures how much the output of a function can change given a small amount of change in the input to the function. The preconditioner may be a 2D ramp filter. (See, Fessler, J. and Booth, S., "Conjugate-Gradient Preconditioning Methods for Shift-Variant PET Image Reconstruction," IEEE Trans. Imag. Proc., 8:688-699, 1999, which is hereby incorporated by reference.) Given a preconditioner of Q, the algorithm for applying convex optimization techniques to find a solution that minimizes the cost function can be represented as follows:

$$f_{n+1} = f_n - \lambda_n r_n$$

$$r_n = d_n + \gamma_n r_{n-1}$$

$$d_n = Q\Phi'(f_n)$$

$$\gamma_n = \begin{cases} 0, & \text{Gradient Descent} \\ \frac{\langle d_n, \Phi'(f_n) - \Phi'(f_{n-1}) \rangle}{\langle d_{n-1}, \Phi'(f_{n-1}) \rangle} & \text{Conjugate Gradient} \end{cases}$$

$$\lambda_n = \frac{\langle r_n, \Phi'(f_n) \rangle}{\langle r_n, \Phi'(f_n) r_n \rangle}$$

where $\lambda_n$ represents a vector with step sizes for the $n^{th}$ iteration, $\gamma_n$ represents a vector with a weight for the prior cost, and $\Phi'$ represents the derivative of the cost function. The least squares functional for the cost function of CT reconstruction can be represented as:

$$\Phi(f) = \frac{1}{2}(Pf-g)^T(Pf-g)$$

Because of the noise in and the approximate nature of CT measurements, there typically is no solution in which Pf=g. The use of the least squares functional allows the constraint of an exact solution to be relaxed so that a solution that minimizes the difference Pf−g can be found. The least square functional is minimized when its derivative is zero as represented by the following equation:

$$\Phi'(f) = P^T(Pf-g) = 0.$$

In some embodiments, the CTIR system may employ a regularized derivative least squares ("RDLS") technique to identify the attenuation coefficients for the foreground voxels. Using the RDLS technique, the CTIR system first generates a foreground volume image mask $f_{FG}$, which stores a one for each voxel that represents a foreground voxel and a zero for each voxel that represents a background voxel. The CTIR system calculates the attenuation coefficients for the foreground voxels by minimizing an RDLS functional as represented by the following:

$$\Phi_{RDLS}(f) = \frac{1}{2}[\nabla(Pf-g)]^T[\nabla(Pf-g)] + \beta R(f)$$

$$= \frac{1}{2}(Pf-g)^T \nabla^T \nabla (Pf-g) + \beta R(f)$$

$$= -\frac{1}{2}(Pf-g)^T \Delta (Pf-g) + \beta R(f)$$

where $\nabla$ represents the gradient, $\Delta$ represents the Laplacian, R(f) represents a regularizer, and $\beta$ represents a weight for the regularizer. The regularizer is a function that penalizes non-smooth solutions. In some embodiments, a regularizer may not be used, and thus, the technique would be considered a non-regularized derivative least squares technique. A regularized derivative least squares technique and a non-regularized derivative least squares technique are each a derivative least squares technique. In some embodiments, the CTIR system may use a regularizer as represented by the following equation:

$$R_p(f) = \|\nabla\|_p$$

where $p \in [1,2]$, and $\|\bullet\|_p$ represents the $L^p$ norm. The cases p=1 and p=2 result in total variation ("TV") and Tikhonov regularization. The gradient and Hessian of the RDLS cost functional are represented by the following equations:

$$\Phi'_{RDLS}(f) = -P^T \Delta (Pf-g) + \beta R'(f)$$

$$\Phi''_{RDLS}(f) = -P^T \Delta P + \beta R''(f)$$

The CTIR system solves for $f_{RDLS}$, which provides an approximation of a difference between foreground regions with the surrounding background regions. The CTIR system then extends $f_{RDLS}$ to the full volume from only the volume representing foreground voxels by setting the attenuation coefficients of the background voxels to zero. The effects of the foreground voxels can mostly be removed by subtracting the forward projection of $f_{RDLS}$ from the measurements g as represented by the following equation:

$$g - Pf_{RDLS}.$$

The transitions resulting from this modified region are smooth because the edges are suppressed by the cost function. The CTIR system then uses a convex optimization technique, such as GD or CG, to reconstruction f starting with $f_0$ initialized to $f_{RDLS}$.

In some embodiments, the CTIR system may employ a regularized least squares simple function ("RLSSF") technique to identify the attenuation coefficients for the initial 3D image. Using the RLSSF technique, the CTIR system generates the initial 3D image by identifying sets of spatially connected foreground voxels and a set of the background voxels and reconstructing the initial 3D image, based on the measurements and the forward projection matrix and enforcing that all the voxels in a set have the same attenuation coefficient. The RLSSF technique thus forces sets of voxels to share the same attenuation coefficient. The sets of voxels are specified using a "simple function." A simple function is of the following form:

$$f_j = \sum_k a_k 1_{A_k}[j]$$

where $\{a_k\}$ represents the set of unknowns (e.g., the attenuation coefficients), $A_k$ represents set k, and $1_{A_k}$ represents the "indicator function" for set k. An indicator function indicates membership of an element j of a set J in a subset $A_k$ of set J. The indicator functions are represented by the following:

$$1_{A_k}[j] = \begin{cases} 1, & \text{if } j \in A_k, \\ 0, & \text{otherwise} \end{cases}$$

An RLSSF functional (i.e., the cost function) for this simple function can be expressed as follows:

$$\Phi(a) = (Pf-g)^T(Pf-g) + \beta R(f)$$

$$= \left(\sum_k a_k P 1_{A_k} - g\right)^T \left(\sum_k a_k P 1_{A_k} - g\right) + \beta R\left(\sum_k a_k 1_{A_k}\right)$$

The gradient of this cost functional can be represented as follows:

$$\frac{\partial}{\partial a_k}\Phi(a) = \sum_j 1_{A_k}[j][P^T(Pf-g) + \beta R'(f)]_j$$

When a preconditioned CG technique is employed to minimize this cost functional, then the step size can be calculated as follows:

$$\lambda_n = \frac{\langle u_n, d_n \rangle}{\langle d_n, P^T P d_n + \beta R''(f_n) d_n \rangle}$$

In some embodiments, a regularizer may not be used, and thus the technique would be considered a non-regularized least squares simple function technique. A regularized least squares simple function technique and a non-regularized least squares simple function technique are each a least squares simple function technique.

In some embodiments, the RDLS and RLSSF cost functions may be composed of other convex data fidelity cost functions. The data fidelity term is the term of the cost function containing the expression (Pf–g). Thus, the cost functions described above are composed of a data fidelity term and a regularization term, $\beta R(f)$. If an $L^2$ data fidelity term is used, the RDLS cost function may be expressed as follows:

$$\Phi_{RDLS}(f) := \frac{1}{2}\langle [D_1(Pf-g)]^2 + [D_2(Pf-g)]^2, 1 \rangle + \beta R(f)$$

where $\langle \bullet, \bullet \rangle$ is the inner product and $D_1, D_2$ are projection-space derivatives, that is $\nabla = (D_1, D_2)^T$. The RDLS cost function may be generalized to have of a general convex data fidelity term as expressed as follows:

$$\Phi_{RDLS}(f) := \frac{1}{2}\langle h(D_1(Pf-g)) + h(D_2(Pf-g)), 1 \rangle + \beta R(f)$$

where $h(\bullet)$ is any convex function. In the original form of RDLS, $h(t)=t^2$. Other convex functions that may be used are $h(t)=|t|^p$ for $p \in [1,2]$ and the Huber loss function which may be expressed as follows:

$$h(t) = \begin{cases} \frac{1}{2}t^2, & \text{if } |t| \leq \delta \\ \delta\left(|t| - \frac{1}{2}\delta\right), & \text{otherwise,} \end{cases}$$

where δ≥0 is a tuning parameter. Similarly, the RLSSF cost function may be extended to have a general convex data fidelity term.

The RDLS and the RLSSF techniques utilize a foreground 3D image. The CTIR system may use various image segmentation techniques to generate the foreground 3D image when there are enough projections and the scanner geometry allows the use of a filtered back projection to construct a 3D image. Alternatively, the CTIR system may generate a binary foreground mask of the projection data $g_{FG}$ with the value for highly attenuated X-rays set to one and the value for all other X-rays set to zero. The CTIR system then generates the foreground 3D image $f_{FG}$ based on the following formula:

$$f_{FG} = 1 - u(P^T(1 - g_{FG}))$$

$$u(t) = \begin{cases} 1, & t > 0 \\ 0, & \text{otherwise} \end{cases}$$

The foreground 3D image will thus have a value of one for each voxel that is part of a region of the object that is occupied by a highly attenuating object or material.

In some embodiments, the RDLS technique may be used to reconstruct 3D images even in the absence of the few-view reconstruction problem. For example, the RDLS technique can be used to refine a 3D image in a sub-region of interest. The semi-local nature of the cost function employed by the RDLS technique allows the reconstruction to concentrate on one or more sub-regions. Conventional approaches to CT reconstruction are global in nature. With the RDLS technique, the voxels in the sub-region of interest can be considered the foreground voxels and the CTIR system can otherwise reconstruct the 3D image as described above. The RDLS technique may be helpful when the CT projections are truncated that is have an interior tomography scenario. The RDLS technique may also be used to reduce partial volume and metal streak artifacts. The RDLS technique may be used in a partial volume technique to remove nonlinear partial volume artifacts. The partial volume technique first identifies regions of foreground voxels of the 3D image and upsamples the foreground voxels of the 3D image by a factor (e.g., of two) to generate a high-resolution 3D image $f_{RDLS,HR}$. The partial volume technique then applies the RDLS technique to the high-resolution 3D image to reconstruct the attenuation coefficients for the high-resolution 3D image. The partial volume technique then downsamples the high-resolution 3D image to generates a standard-resolution 3D image $f_{RDLS}$. The partial volume technique then corrects the measurements g by subtracting the forward projection of the high-resolution 3D image from the measurements to generate partial-volume corrected data $g_{PVC}$ as represented by the following:

$$g_{PVC} = g - Pf_{RDLS,HR}.$$

The partial volume technique then reconstructs a 3D image from the partial-volume corrected data and adds the reconstructed 3D image to the standard-resolution 3D image $f_{RDLS}$ to give the final 3D image.

The CTIR system uses either the RDLS technique or the RLSSF technique to set the initial 3D image for the standard, full field of view ("FOV") iterative CT image reconstruction. With this initial 3D image, the difference between the measurements and the forward projection of the initial 3D image $g-Pf_0$ has reduced contrast and reduced high frequency content. In the first iteration of the convex optimization technique, the 3D image $f_1$, that is the full FOV reconstruction, is modified by the back projection of this difference. Since this difference has reduced contrast and reduced high frequency contents, the update to the 3D image of this iteration will also have reduced contrast and reduced high frequency. At each subsequent iteration, the 3D image similarly will only have high contrast and high frequency content introduced by $f_0$. With the RDLS technique, the initial 3D image does not have streak artifacts because the background voxels (e.g., corresponding to non-metal materials) are zero. With the RLSSF technique, the initial 3D image will have reduced streak artifacts because this RLSSF technique has fewer unknowns and thus has a small null space, which is where streak artifacts reside.

Figure 1:
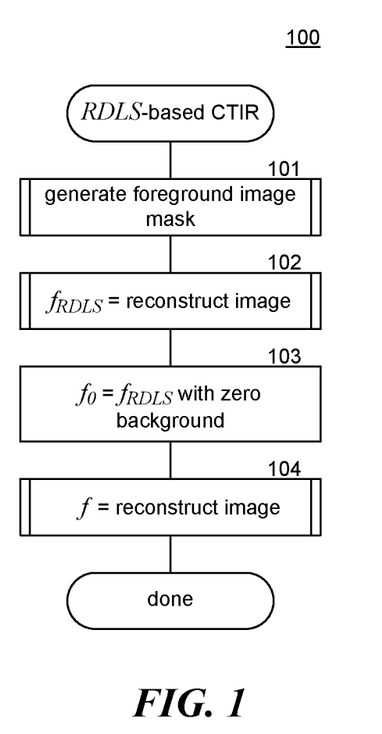
FIG. 1 is a flow diagram that illustrates processing of a regularized derivative least square implementation of the CTIR system in some embodiments.

FIG. 1 is a flow diagram that illustrates processing of a regularized derivative least square implementation of the CTIR system in some embodiments. A RDLS-based component 100 inputs measurements and a forward projection matrix of a CT scan of an object and generates a final 3D image using the RDLS technique. In block 101, the component invokes a component to generate a foreground 3D image mask that identifies the foreground voxels of the 3D image. In block 102, the component invokes a reconstruct image component passing an indication of the RDLS functional as the cost function and the foreground 3D image mask to reconstruct a foreground 3D image $f_{RDLS}$. In block 103, the component sets the initial 3D image for reconstruction of the final 3D image to $f_{RDLS}$ with the background voxels sets to zero. In block 104, the component invokes a reconstruct image component passing an indication of the initial 3D image and a cost function to generate the final 3D image and then completes.

Figure 2:
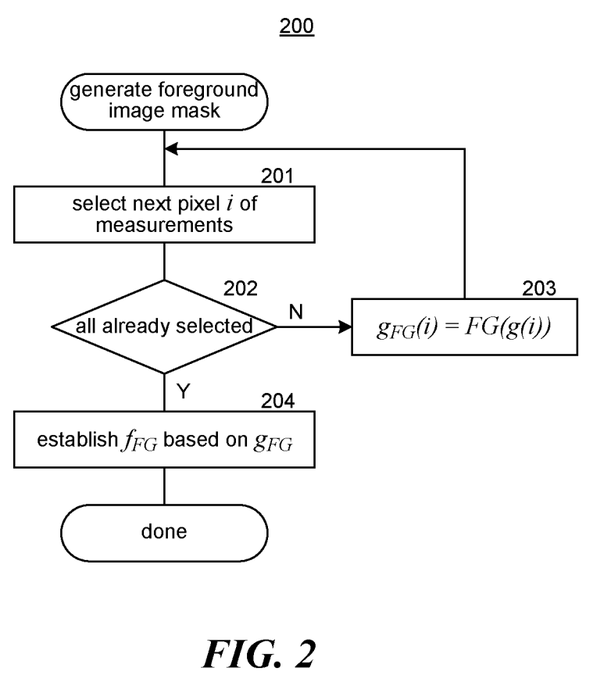
FIG. 2 is a flow diagram that illustrates processing of a foreground 3D image mask in some embodiments.

FIG. 2 is a flow diagram that illustrates processing of a generate foreground 3D image mask in some embodiments. A generate foreground 3D image mask component 200 identifies the pixels of the measurements that are part of the foreground and sets a foreground value for a voxel to one if the voxel is a foreground voxel and to zero otherwise. In block 201, the component selects the next pixel i of the measurements. In decision block 202, if all the pixels have already been selected, then the component continues at block 204, else the component continues at block 203. In block 203, the component sets the value of a foreground mask $g_{FG}$ (i) for the selected pixel to a foreground function FG of the measurement for that pixel g(i) and loops to block 201 to select the next pixel. The foreground function evaluates to a one if the measurement indicates that the pixel is part of the foreground and to a zero otherwise. For example, the foreground function may evaluate to one when the measurement is above a threshold intensity value. The threshold intensity value may be established independently of the actual measurements or may be established based on the analysis of the actual measurements. The component may also generate two clusters of the measurements that seeks to maximize the difference between the averages of the measurements the clusters where one cluster represents foreground voxels and the other cluster represents background voxels. In block 204, the component uses a back projection technique to identify the foreground voxels as described above in the formula for $f_{FG}$. The component generates a background mask that indicates measurements that satisfy a high-intensity criterion, which may be generated by inverting a foreground mask that indicates measurement that do not satisfy the high-intensity criterion. The component generates a back projection of the background mask based on the forward projection model, the back projection having voxels. The component sets the voxels of the foreground 3D image mask to zero when the corresponding voxel of the back projection is greater to zero and to one when the corresponding voxel of the back projection is not greater than zero. The component then completes.

Figure 3:
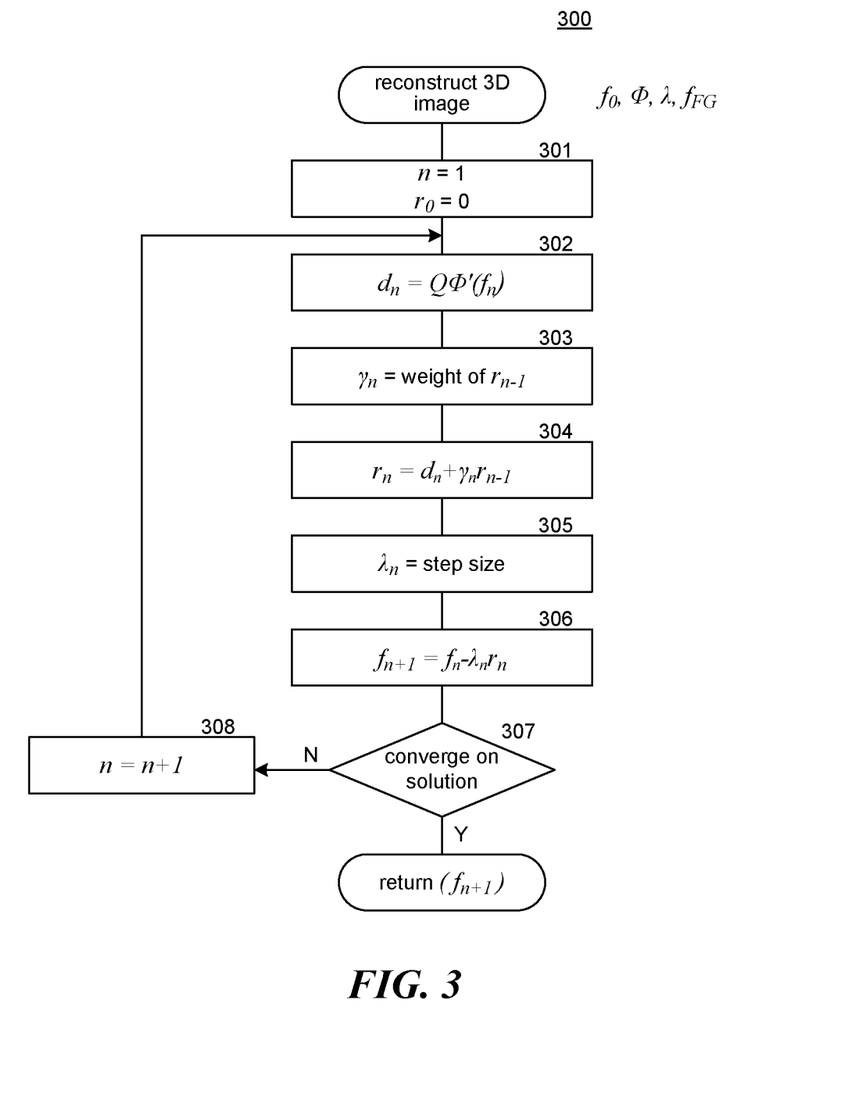
FIG. 3 is a flow diagram that illustrates a component to reconstruct 3D images based on measurements and a forward projection matrix in some embodiments.

FIG. 3 is a flow diagram that illustrates a component to reconstruct a 3D image based on measurements and a forward projection matrix in some embodiments. A reconstructed 3D image component 300 may be adapted to receive various input parameters such an initial 3D image $f_0$, a cost functional $\Phi$. The component loops generating 3D images until a solution criterion is satisfied. In block 301, the component initializes an iteration count variable n and variable $r_n$. Variable $r_n$ represents contribution of the gradient of the cost function plus a weighted sum of the contribution of the gradient of the cost function of the prior iteration. In bock 302, the component calculates the value of the preconditioned derivative $d_n$ of the cost function. In block 303, the component calculates a weight for the prior gradient of the cost function. In block 304, the component sets the variable $r_n$. In block 305, the component computes the step size. In block 306, the component calculates the attenuation coefficients for the 3D image of the next iteration. In decision block, if the attenuation coefficients satisfy a solution criterion, then the component returns $f_{n+1}$ as the final 3D image, else the component continues at block 308. The solution criterion be satisfied, for example, the distance between $f_n$ and $f_{n+1}$ is less than some threshold distance. In block 308, the component increments to the next iteration and loops to block 302.

Figure 4:
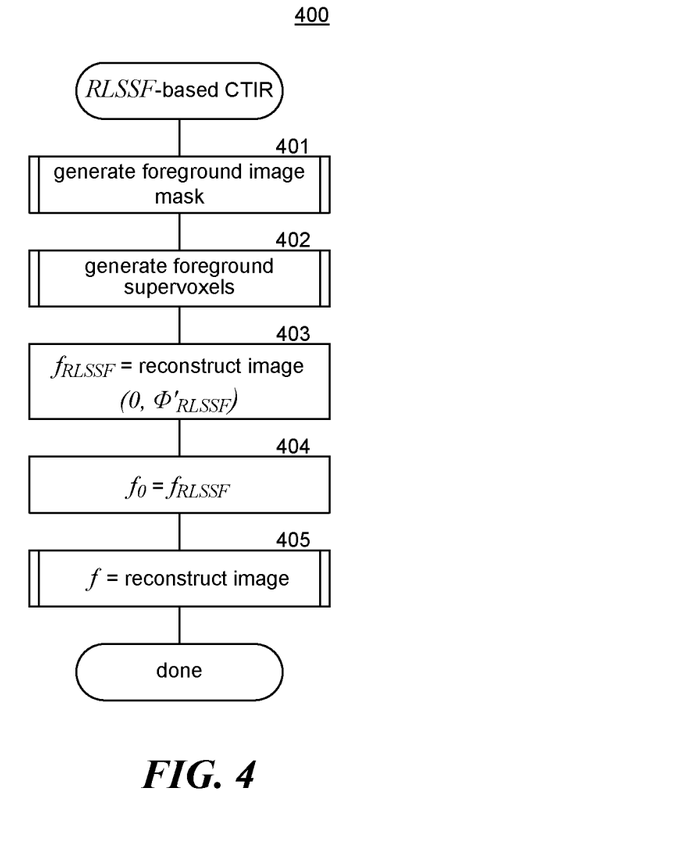
FIG. 4 is a flow diagram that illustrates processing of a regularized least square simple function based implementation of the CTIR system in some embodiments.

FIG. 4 is a flow diagram that illustrates processing of a regularized least square simple function-based implementation of the CTIR system in some embodiments. An RLSSF-based component 400 inputs measurements and a forward projection matrix of a CT scan of an object and generates a final 3D image using the RLSSF technique. In block 401, the component invokes a component to generate a foreground 3D image mask that identifies the foreground voxels of the 3D image. In block 402, the component invokes a generate supervoxels component to generate foreground supervoxels and a background supervoxel based on the foreground 3D image mask. Alternatively, the component may generate a supervoxel for each background voxel. In block 403, the component invokes a reconstruct image component passing an indication of the RLSSF cost functional and the supervoxels to reconstruct a 3D image $f_{RLSSF}$. In block 404, the component sets the initial 3D image $f_0$ for the final reconstruction to $f_{RLSSF}$. In block 405, the component invokes a reconstruct image component passing an indication of the initial 3D image and a cost function to generate the final 3D image.

Figure 5:
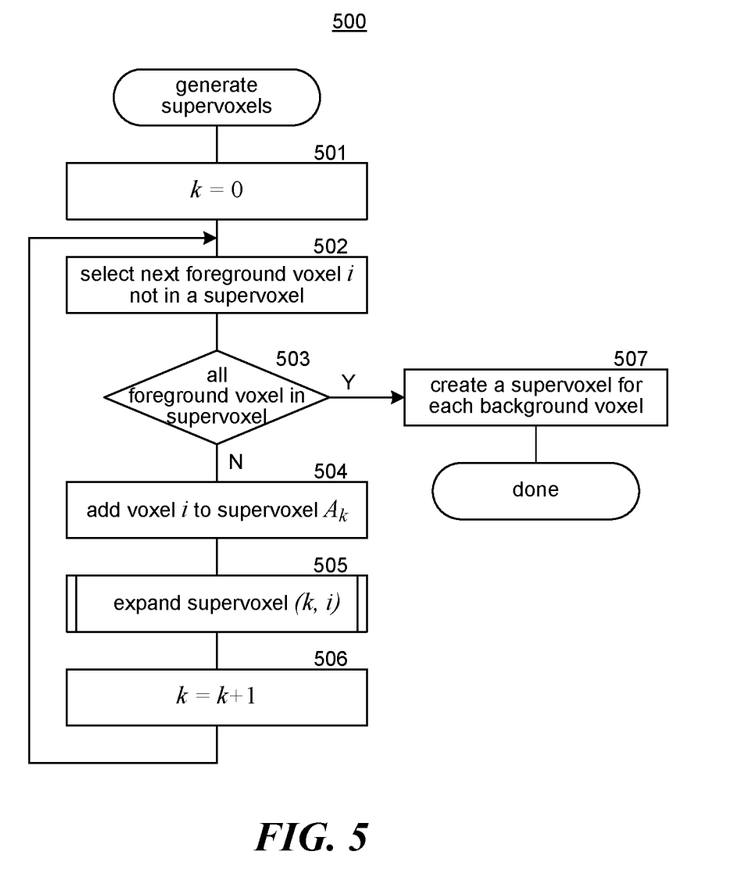
FIG. 5 is a flow diagram that illustrates processing of a component to generate supervoxels in some embodiments.

FIG. 5 is a flow diagram that illustrates processing of a component to generate supervoxels in some embodiments. A generate supervoxels component 500 generates supervoxels for the foreground voxels and a supervoxel for each of the background voxels. In block 501, the component initializes a variable k indicating the number of foreground supervoxels. In block 502, the component selects the next foreground voxel i that is not in a supervoxel. In decision block 503, if all the foreground voxels are in a supervoxel, then the component continues at block 507, else the component continues at block 504. In block 504, the component creates a new supervoxel $A_k$ that includes the selected voxel i. In block 505, the component invokes a component to expand the supervoxel to include all neighboring foreground voxels. In block 506, the component increments the number of foreground supervoxels and loops to block 502 to select the next foreground voxel that is not in a supervoxel. In block 507, the component creates a supervoxel for each background voxel and then completes.

Figure 6:
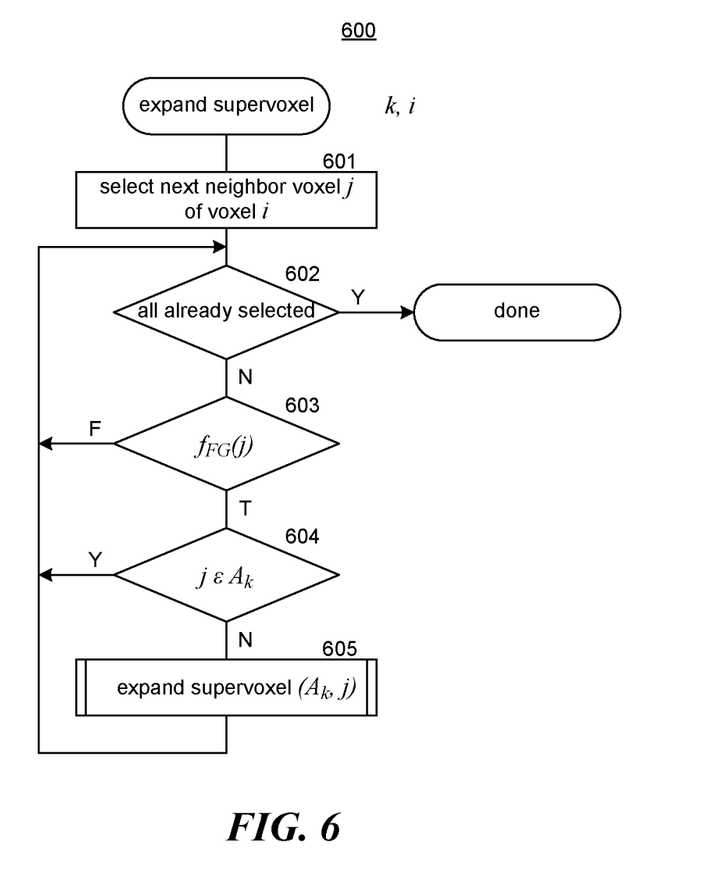
FIG. 6 is a flow diagram that illustrates processing of a component that expands a supervoxel in some embodiments.

FIG. 6 is a flow diagram that illustrates processing of a component that expands a supervoxel in some embodiments. An expand supervoxel component 600 is passed an indication of a supervoxel k and a voxel i that is in the supervoxel and expands that supervoxel. In block 601, the component selects a neighbor voxel j of voxel i. In decision block 602, if all neighbor voxels have already been selected, then the component completes, else the component continues at block 603. In decision block 603, if selected neighbor voxel j is a foreground voxel, then the component continues at block 604, else the component loops to block 601 to select the next neighbor voxel. In decision block 604, if the selected voxel j is already in the supervoxel k, then the component loops to block 601 to select the next neighbor voxel, else the component continues at block 605. In decision block 605, the component invokes the expand supervoxel component passing an indication of the selected voxel j and the supervoxel k to expand the supervoxel to include neighbor voxels of selected voxel j. The component then loops to block 601 to select the next neighbor voxel.

The computing systems on which the CTIR system may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The computing systems may include servers of a data center, massively parallel systems, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on them or may be encoded with computer-executable instructions or logic that implements the CTIR system. The data transmission media are used for transmitting data via transitory, propagating signals or carrier waves (e.g., electromagnetism) via a wired or wireless connection.

The CTIR system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the CTIR system may be implemented in hardware using, for example, an application-specific integrated circuit (ASIC).

The following paragraphs describe various embodiments of aspects of the CTIR system. An implementation of the CTIR system may employ any combination of the embodiments. The processing described below may be performed by a computing device with a processor that executes computer-executable instructions stored on a computer-readable storage medium that implements the CTIR system.

In some embodiments, a method performed by a computing system for generating a 3D image of an object from measurements of an object and a forward projection matrix is provided. The method identifies foreground voxels of the 3D image. The method generates, based on the measurements, the forward projection matrix, and the foreground voxels, an initial 3D image that specifies reconstructed attenuation coefficients for at least the foreground voxels of the 3D image. The method reconstructs, based on the measurements and the forward projection matrix, the 3D image by iteratively generating 3D images starting with the 3D image initialized to the initial 3D image until a solution criterion is satisfied. In some embodiments, the initial 3D image is generated using a regularized derivative least squares technique. In some embodiments, the initial 3D image is generated using a derivative least squares technique. In some embodiments, the initial 3D image is generated using a regularized derivative least squares simple function technique. In some embodiments, the initial 3D image is generated using a derivative least squares simple function technique. In some embodiments, the generating of the initial 3D image comprises generating a foreground volume image mask based on the forward projection matrix and the foreground voxels and setting the attenuation coefficients for voxels of the initial 3D image based on the measurements and the foreground volume image mask. In some embodiments, a cost function for the reconstructing of the foreground 3D image is a derivative least squares functional. In some embodiments, the derivative least squares functional is a regularized derivative least squares functional. In some embodiments, the cost function is represented as follows:

$$\Phi_{RDLS}(f) = \frac{1}{2}[\nabla(Pf-g)]^T[\nabla(Pf-g)] + \beta R(f)$$

where $\Phi_{RDLS}(f)$ represents the cost function, $\nabla$ represents the gradient, P represents the forward projection matrix, f represents the attenuation coefficients, g represents the measurements, R(f) represents a regularizer, and $\beta$ represents a weight of the regularizer. In some embodiments, the generating of the initial 3D image comprises identifying sets of spatially connected foreground voxels and a set of the background voxels and reconstructing the initial 3D image, based on the measurements and the forward projection matrix and assuming that all the voxels in a set have the same attenuation coefficient. In some embodiments, a cost function of the reconstructing of the initial 3D image is a least squares of a simple function. In some embodiments, the cost function is a regularized least squares of a simple function. In some embodiments, the cost function is represented by the following:

$$\Phi(a) = \left(\sum_k a_k P1_{A_k} - g\right)^T \left(\sum_k a_k P1_{A_k} - g\right) + \beta R\left(\sum_k a_k 1_{A_k}\right)$$

where $\Phi(a)$ represents the cost function, P represents the forward projection matrix, $\{a_k\}$ represents the set of the attenuation coefficients, $A_k$ represents set k of attenuation coefficients, and $1_{A_k}$ represents an indicator function for set k, g represents the measurements, R(f) represents a regularizer, and $\beta$ represents the weight of the regularizer. In some embodiments, the method further generates a foreground image mask that identifies voxels of the 3D image that are considered to be in the foreground. In some embodiments, the cost function is represented as follows:

$$\Phi_{RDLS}(f) := \frac{1}{2}\langle h(D_1(Pf-g)) + h(D_2(Pf-g)), 1\rangle + \beta R(f)$$

where $\langle \bullet, \bullet \rangle$ is the inner product, $D_1$ and $D_2$ are projection-space derivatives, and $h(\bullet)$ is a convex function. In some embodiments, $h(t)=t^2$. In some embodiments, $h(t)=|t|^p$ where $p \in [1,2]$. In some embodiments, $$h(t) = \begin{cases} \frac{1}{2}t^2, & \text{if } |t| \leq \delta \\ \delta(|t| - \frac{1}{2}\delta), & \text{otherwise,} \end{cases}$$

where $\delta \geq 0$ is a tuning parameter.

In some embodiments, a method performed by a computing system for generating a 3D image of an object is provided. The method scans the object at various angles using an X-ray scanner that includes an X-ray source and an X-ray detector to generate measurements derived from pixel values of the X-ray detector. The method generates a forward projection matrix for mapping attenuation coefficients of voxels of the 3D image of the object to the measurements. The method, based on the measurements and the forward projection matrix, an initial 3D image that specifies reconstructed attenuation coefficients for at least the foreground voxels of the 3D image. The method reconstructs, based on the measurements and the forward projection matrix, the 3D image by iteratively generating 3D images starting with the 3D image initialized to the initial 3D image until a solution criterion is satisfied. In some embodiments, a cost function for the reconstructing of the foreground 3D image is a regularized derivative least squares functional. In some embodiments, the cost function is represented as follows:

$$\Phi_{RDLS}(f) = \frac{1}{2}[\nabla(Pf-g)]^T[\nabla(Pf-g)] + \beta R(f)$$

where $\Phi_{RDLS}(f)$ represents the cost functional, $\nabla$ represents the one or two dimensional gradient, P represents the forward projection matrix, f represents the attenuation coefficients, g represents the measurements, R(f) represents a regularizer, and $\beta$ represents a weight of the regularizer. In some embodiments, the method further generates a foreground image mask that identifies voxels of the 3D image that are considered to be in the foreground. In some embodiments, the method further generates a cross-sectional image from the reconstructed 3D image.

In some embodiments, a computing system for generating a 3D image of an object from measurements of an object and a forward projection matrix is provided. The computing system includes a computer-readable storage medium storing computer-executable instruction and a processor for executing the computer-readable instructions stored in the computer-readable storage medium. The instructions generate, based on the measurements and the forward projection matrix, an initial 3D image that specifies reconstructed attenuation coefficients for voxels in the 3D image. The instructions reconstruct based on the measurements and the forward projection matrix, the 3D image by iteratively generating 3D images starting with the 3D image seeded with to the initial 3D image until a solution criterion is satisfied. In some embodiments, the voxels are foreground voxels that are upsampled, the initial 3D image is an high-resolution 3D image that is downsampled to form a standard-resolution 3D image, and the computer-executable instructions further comprise instructions that adjust the measurements for use in the reconstruction of the final image by subtracting a forward projection of the high-resolution 3D image. In some embodiments, the initial 3D image is generated based on a cost function that is a regularized derivative least squares function.

In some embodiments, a method performed by a computing system for generating a 3D image of an object from measurements of an object and a forward projection matrix is provided. The method selects a subset of the voxels of the 3D image. The method generates, based on the measurements and the forward projection matrix, an initial 3D image that specifies reconstructed attenuation coefficients for voxels in the 3D image using the following cost function:

$$\Phi_{RDLS}(f)=\tfrac{1}{2}[\nabla(Pf-g)]^T[\nabla(Pf-g)]$$

where $\Phi_{RDLS}(f)$ represents a cost function, $\nabla$ represents the gradient, P represents the forward projection matrix, f represents attenuation coefficients, and g represents the measurements. In some embodiments, the cost functional includes as regularizer.

In some embodiments, a method performed by a computing system for generating a foreground 3D image mask indicating voxels of an object that are occupied by matter that satisfies a high attenuation criterion is provided. The method accesses measurements of intensities and a forward projection model of an X-ray scan of the object. The method generates a background mask that indicates measurements that satisfy a low-intensity criterion. The method performs a back projection of the background mask based on the forward projection model, the back projection having voxels. The method sets the voxels of the foreground 3D image mask to zero when the corresponding voxel of the back projection is greater than zero and to one when the corresponding voxel of the back projection is not greater than zero. In some embodiments, the generating of the background mask includes inverting a foreground mask. In some embodiments, the foreground mask indicates measurement that do not satisfy the high-intensity criterion. In some embodiments, Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

The invention claimed is:

1. A method performed by a computing system for generating a 3D image of an object from measurements of the object and a forward projection matrix, the method comprising:
   identifying foreground voxels of the 3D image;
   generating, based on the measurements, the forward projection matrix, and the foreground voxels, an initial 3D image that specifies reconstructed attenuation coefficients for at least the foreground voxels of the 3D image; and
   reconstructing, based on the measurements and the forward projection matrix, the 3D image by iteratively generating 3D images starting with the 3D image initialized to the initial 3D image until a solution criterion is satisfied.

2. The method of claim 1 wherein the initial 3D image is generated using a regularized derivative least squares technique.

3. The method of claim 1 wherein the initial 3D image is generated using a derivative least squares technique.

4. The method of claim 1 wherein the generating of the initial 3D image comprises generating a foreground volume image mask based on the forward projection matrix and the foreground voxels and setting the attenuation coefficients for voxels of the initial 3D image based on the measurements and the foreground volume image mask.

5. The method of claim 4 wherein a cost function for the reconstructing of the foreground 3D image is a derivative least squares functional.

6. The method of claim 5 wherein the derivative least squares functional is a regularized derivative least squares functional.

7. The method of claim 6 wherein the cost function is represented as follows:

$$\Phi_{RDLS}(f)=\tfrac{1}{2}[\nabla(pf-g)]T[\nabla(pf-g)]+\beta R(f)$$

where $\Phi_{RDLS}(f)$ represents the cost function, $\nabla$ represents the gradient, P represents the forward projection matrix, f represents the attenuation coefficients, g represents the measurements, R(f) represents a regularizer, and $\beta$ represents a weight of the regularizer.

8. The method of claim 1 further comprising generating a foreground image mask that identifies voxels of the 3D image that are considered to be in the foreground.

9. The method of claim 1 wherein the cost function is represented as follows:

$$\Phi_{RDLS}(f):=\tfrac{1}{2}<h(D_1(Pf-g))+h(D_2(Pf-g)),1>+\beta R(f)$$

where $<\bullet,\bullet>$ is the inner product, $D_1$ and $D_2$ are projection-space derivatives, and $h(\bullet)$ is a convex function.

10. The method of claim 9 wherein $h(t)=t^2$.

11. The method of claim 9 wherein $h(t)=|t|_p$ where $p\in[1, 2]$.

12. The method of claim 9 wherein $$h(t) = \begin{cases} \tfrac{1}{2}t^2, & \text{if } |t| \le \delta \\ \delta\left(|t| - \tfrac{1}{2}\delta\right), & \text{otherwise,} \end{cases}$$

where $\delta \ge 0$ is a tuning parameter.

13. The method of claim 1 wherein the initial 3D image is generated using a regularized derivative least squares simple function technique.

14. The method of claim 1 wherein the initial 3D image is generated using a derivative least squares simple function technique.

15. The method of claim 1 wherein the generating of the initial 3D image comprises identifying sets of spatially connected foreground voxels and a set of the background voxels and reconstructing the initial 3D image, based on the measurements and the forward projection matrix and assuming that all the voxels in a set have the same attenuation coefficient.

16. The method of claim 15 wherein a cost function of the reconstructing of the initial 3D image is a least squares of a simple function.

17. The method of claim 16 wherein the cost function is a regularized least squares of a simple function.

18. The method of claim 17 wherein the cost function is represented by the following:

$$\Phi(a) = \left(\sum_k a_k P1_{A_k} - g\right)^T \left(\sum_k a_k P1_{A_k} - g\right) + \beta R\left(\sum_k a_k 1_{A_k}\right)$$

where $\Phi(a)$ represents the cost function, P represents the forward projection matrix, $\{a_k\}$ represents the set of the attenuation coefficients, $A_k$ represents set k of attenuation coefficients, and $1_{a_k}$ represents an indicator function for set k, g represents the measurements, R(f) represents a regularizer, and $\beta$ represents the weight of the regularizer.

19. A method performed by a computing system for generating a 3D image of an object, the method comprising:

scanning the object at various angles using an X-ray scanner that includes an X-ray source and an X-ray detector to generate measurements derived from pixel values of the X-ray detector;

generating a forward projection matrix for mapping attenuation coefficients of voxels of the 3D image of the object to the measurements;

generating, based on the measurements and the forward projection matrix, an initial 3D image that specifies reconstructed attenuation coefficients for at least the foreground voxels of the 3D image; and reconstructing, based on the measurements and the forward projection matrix, the 3D image by iteratively generating 3D images starting with the 3D image initialized to the initial 3D image until a solution criterion is satisfied.

20. The method of claim 19 wherein a cost function for the reconstructing of the foreground 3D image is a regularized derivative least squares functional.

21. The method of claim 20 wherein the cost function is represented as follows:

$$\Phi_{RDLS}(f)=\tfrac{1}{2}[\nabla(Pf-g)]^T[\nabla(Pf-g)]+\beta R(f)$$

where $\Phi_{RDLS}(f)$ represents the cost functional, $\nabla$ represents the one or two dimensional gradient, P represents the forward projection matrix, f represents the attenuation coefficients, g represents the measurements, R(f) represents a regularizer, and $\beta$ represents a weight of the regularizer.

22. The method of claim 19 further comprising generating a foreground image mask that identifies voxels of the 3D image that are considered to be in the foreground.

23. The method of claim 19 further comprising generating a cross-sectional image from the reconstructed 3D image.

24. A computing system for generating a 3D image of an object from measurements of the object and a forward projection matrix, the computing system comprising:

a computer-readable storage medium storing computer-executable instructions that include:

instructions that generate, based on the measurements and the forward projection matrix, an initial 3D image that specifies reconstructed attenuation coefficients for voxels in the 3D image; and instructions that reconstruct, based on the measurements and the forward projection matrix, the 3D image by iteratively generating 3D images starting with the 3D image seeded with the initial 3D image until a solution criterion is satisfied; and a processor for executing the computer-readable instructions stored in the computer-readable storage medium.

25. The computing system of claim 24 wherein the voxels are foreground voxels that are upsampled, the initial 3D image is an high-resolution 3D image that is downsampled to form a standard-resolution 3D image, and the computer-executable instructions further comprise instructions that adjust the measurements for use in the reconstruction of the final image by subtracting a forward projection of the high-resolution 3D image.

26. The computing system of claim 24 wherein the initial 3D image is generated based on a cost function that is a regularized derivative least squares function.

27. A method performed by a computing system for generating a 3D image of an object from measurements of the object and a forward projection matrix, the method comprising:

selecting a subset of the voxels of the 3D image;

generating, based on the measurements and the forward projection matrix, an initial 3D image that specifies reconstructed attenuation coefficients for voxels in the 3D image using the following cost function:

$$\Phi_{RDLS}(f)=\tfrac{1}{2}[\nabla(Pf-g)]^T[\nabla(Pf-g)]$$

where $\Phi_{RDLS}(f)$ represents a cost function, $\nabla$ represents the gradient, P represents the forward projection matrix, f represents attenuation coefficients, and g represents the measurements.

28. The method of claim 27 wherein the cost functional includes as regularizer.

29. A method performed by a computing system for generating a foreground 3D image mask indicating voxels of an object that are occupied by matter that satisfies a high attenuation criterion, the method comprising:

accessing measurements of intensities and a forward projection model of an X-ray scan of the object;

generating a background mask that indicates measurements that satisfy a high intensity criterion;

performing a back projection of the background mask based on the forward projection model, the back projection having voxels; and setting the voxels of the foreground 3D image mask to zero when the corresponding voxel of the back projection is greater than zero and to one when the corresponding voxel of the back projection is not greater than zero.

30. The method of claim 29 wherein the generating of the background mask includes inverting a foreground mask.

31. The method of claim 30 wherein the foreground mask indicates measurement that do not satisfy the high-intensity criterion.

* * * * *